United States Patent [19]
Inadama

[11] Patent Number: 5,997,345
[45] Date of Patent: Dec. 7, 1999

[54] IC CARD CONNECTOR WITH CLICK PROJECTION FOR INSERT CONTROL

[75] Inventor: Masayuki Inadama, Miyagi-ken, Japan

[73] Assignee: Alps Electric Co., Ltd., Japan

[21] Appl. No.: 09/153,543

[22] Filed: Sep. 15, 1998

[30] Foreign Application Priority Data

Sep. 16, 1997 [JP] Japan ..................... 9-250633

[51] Int. Cl.⁶ ............................................. H01R 3/00
[52] U.S. Cl. ............................................ 439/489; 439/630
[58] Field of Search ............................. 439/630, 489, 439/260; 235/441

[56] References Cited

U.S. PATENT DOCUMENTS 5,198,645 3/1993 Martin ........................... 439/630

5,520,551 5/1996 Broschard, III .

*Primary Examiner*—Neil Abrams
*Assistant Examiner*—Javaid Nasri
*Attorney, Agent, or Firm*—Brinks Hofer Gilson & Lione

[57] ABSTRACT

An IC card connector wherein an elastic piece is provided on a base of a housing, extending cantilevered in the direction of IC card insertion and using the free end portion thereof as a click projection. The IC card drives the click projection immediately before complete insertion to produce a feel of a click, thus completing the insertion of the IC card, so that the user inserting the IC card into a card slot of the housing will be able to definitely know proper card insertion by the feel of click and vibration.

2 Claims, 7 Drawing Sheets

IC CARD CONNECTOR WITH CLICK PROJECTION FOR INSERT CONTROL

BACKGROUND OF THE INVENTION

1. Field of the Invention The present invention relates to an IC card connector to be used for inputting a signal to, and outputting a signal from, an IC card inserted, and more particularly, to an IC card connector which requires accurate positioning in relation to a contact of the connector.

2. Description of the Related Art

The IC card is a card within which an integrated circuit having microprocessing and memory functions is embedded. External equipment, for instance a personal computer, a digital camera, etc., which performs information processing by use of such an IC card as a medium, is provided with an IC card connector provided with a plurality of terminals corresponding to contacts arranged on the bottom surface of the IC card.

Figure 14A:
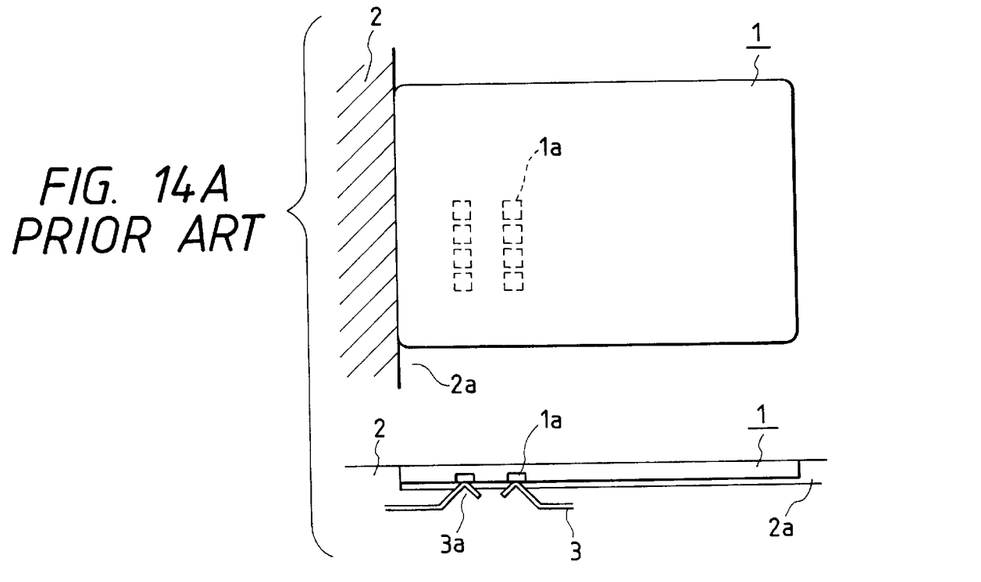
FIGS. 14A and 14B are reference drawings for explaining problems of a prior art.
Figure 14B:
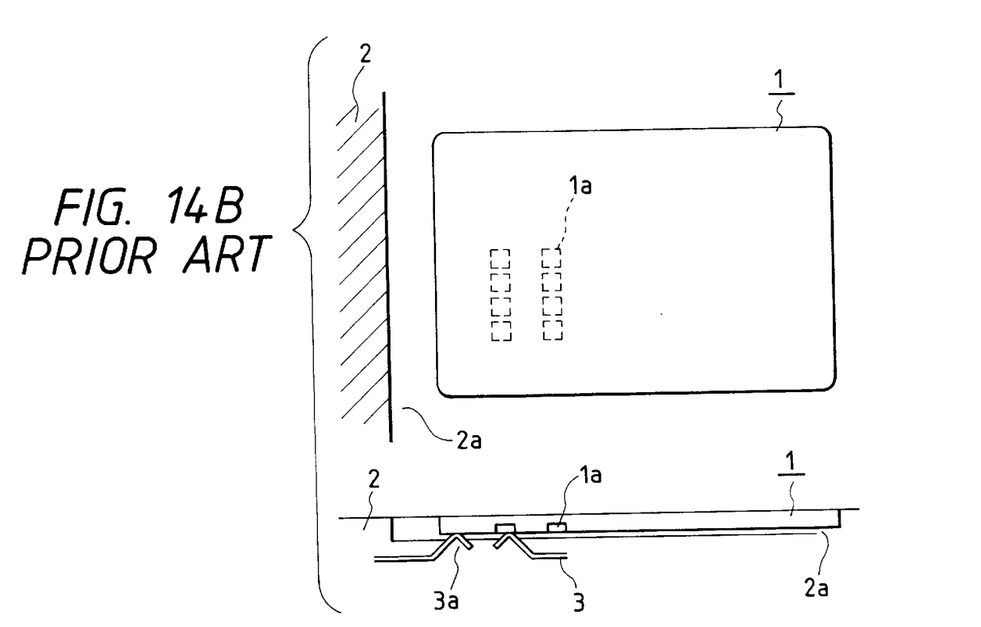

The IC card connector is used with an IC card inserted into a card slot. After the completion of insertion of the IC card into the card slot, the IC card is held in the state that each contact is in contact with each terminal of the connector, so that signals can be inputted and outputted. That is, as shown in FIG. 14A, when the IC card 1 is inserted fully into the card slot 2a of the connector 2, each contact 1a disposed on the bottom surface of the IC card 1 contacts each terminal 3 of the connector 2 with a contact portion 3a protruded into the card slot 2a. Therefore, if the IC card 1 inserted in the card slot 2a is not in a specific loading position, the contact 1a of the IC card 1 is not in contact with the corresponding terminal 3 as shown in FIG. 14B. In this case, proper input and output of signals can not be performed.

The IC card connector generally incorporates a detection switch which detects whether or not the insertion of the IC card into the card slot is completed. The detection switch is designed to be actuated by the IC card immediately before the completion of card insertion to thereby turn on and off the contact section. Therefore, the detection switch will not operate when incompletely inserted as shown in FIG. 14B for example. It is, therefore, possible to prevent, by the use of this detection switch, a malfunction resulting from defective contact between the contact of the IC card and the connector terminal and impairment of electronic components likely to occur in the case they contact to each other at an undesirable position.

The IC card connector usually incorporates a detection switch for detecting the completion of insertion of the IC card as described above. The IC card, however, is not provided with a means by which the user inserting the IC card into the IC card connector can definitely feel that the IC card has been properly inserted. The user can see the completion of IC card insertion when the IC card inserted has come into contact at the forward end with the innermost part in the card slot of the connector and can not be pushed further inward. To the user, IC card insertion, if a little incomplete, makes no big difference from proper insertion; therefore the user is likely to make the mistake that the IC card is fully inserted notwithstanding the IC card is held partway in the connector.

If the IC card is held in the connector in an incompletely inserted state due to the user's mistake, the detection switch will not operate, so that no malfunction of the detection switch will occur and the electronic components will not be impaired. In this case, however, no signal is inputted and outputted, and user is apt to mistake this state of the switch as a trouble. Particularly, when an IC card which requires correct positioning after complete insertion in relation to the connector is used, the detection switch tends to operate immediately before the completion of IC card insertion. If, in this case, the user mistakes that the IC card has been properly inserted, the equipment using the IC card will fail to work properly or the electronic components will be impaired.

SUMMARY OF THE INVENTION

The IC card connector of the present invention is provided with an elastic piece in the housing section. The elastic piece is supported cantilevered and extended in the direction of IC card insertion, so that the free end thereof is formed as a click projection. Immediately before the completion of insertion when the click projection is driven by the IC card, a click is produced, thus completing the IC card insertion. According to the IC card connector of the above-described constitution, the user inserting the IC card into the card slot formed in the housing is able to definitely feel by a click and vibration the proper insertion of the IC card. It is, therefore, possible to prevent incomplete insertion of the IC card.

The IC card connector of the present invention is provided with a housing having a card slot into which the IC card is inserted, a plurality of terminals fixed cantilevered in the housing and having contact portions protruding into the card slot, a detection switch mounted in the back of the card slot for detecting whether or not IC card insertion into the card slot has been completed, and an elastic piece extended cantilevered in the direction of IC card insertion and formed as a click projection with the free end thereof protruding into the card slot. When the click projection is driven by the forward end in the direction of insertion of the IC card to push to deflect the elastic piece, a plurality of contacts arranged on the IC card come into elastic contact with the corresponding contact portions respectively, and the IC card turns on and off the detection switch.

Furthermore, in the IC card connector of the above-described constitution, it is desirable that the click projection of the elastic piece be designed to be positioned in the vicinity of the detection switch because the timing of driving the click projection to produce a feel of a click and the timing of on-off operation of the detection switch can easily be adjusted for substantial agreement.

DESCRIPTION OF THE PREFERRED EMBODIMENT

Figure 1:
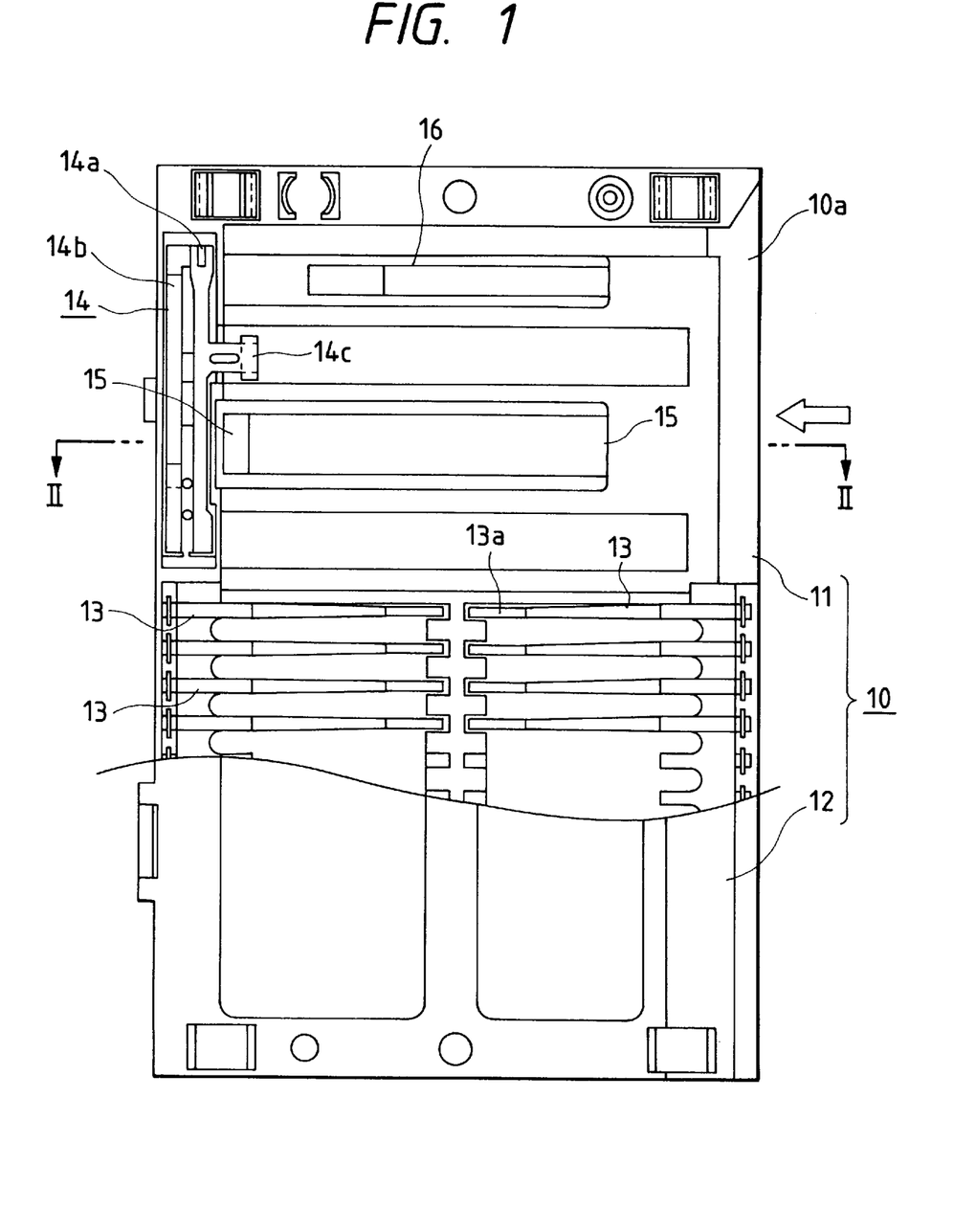
FIG. 1 is a plan view, p artly in section, showing an embodiment of an IC card connector according to the present invention.
Figure 2:
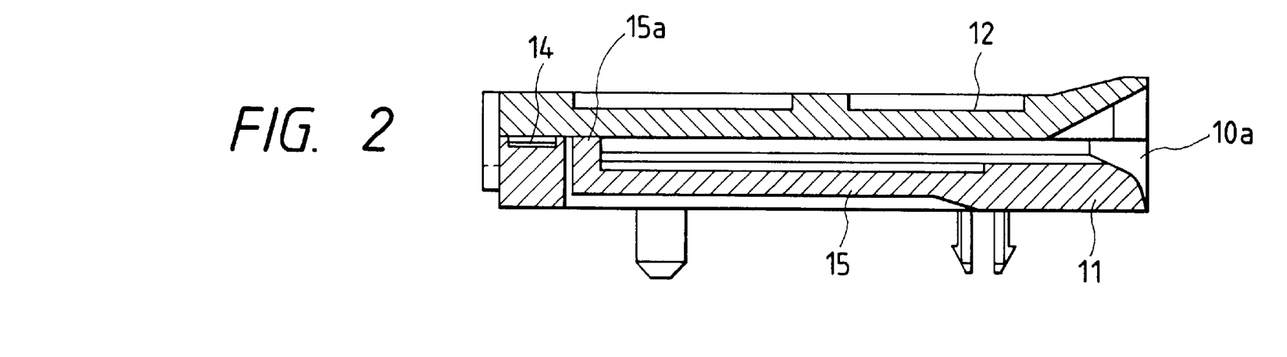
FIG. 2 is a longitudinal sectional view of the connector taken along line II—II of FIG. 1.
Figure 3:
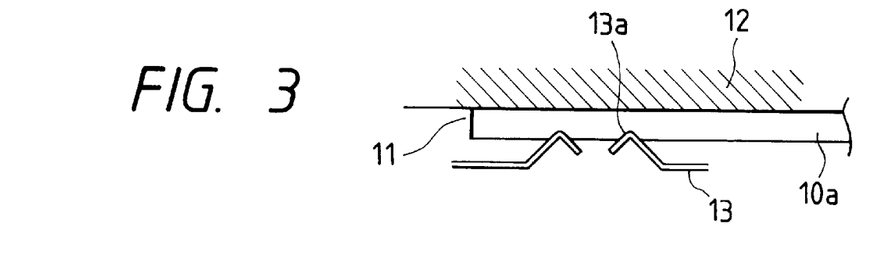
FIG. 3 is an explanatory view of a major portion showing a terminal of the connector in the initial state of FIGS. 1 and 2 in which the IC card is not inserted.
Figure 4:
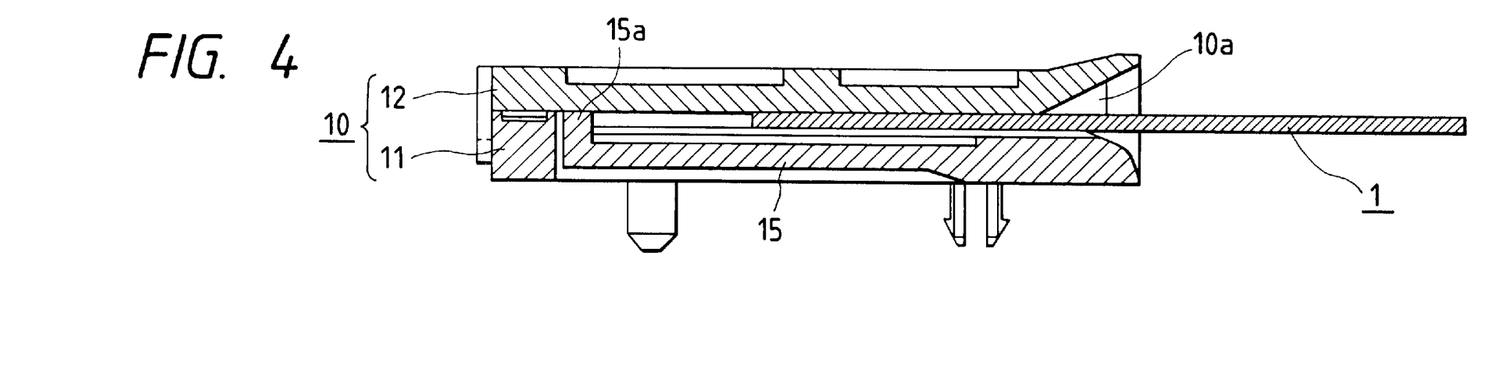
FIG. 4 is an explanatory view showing the IC card inserted partway.
Figure 5:
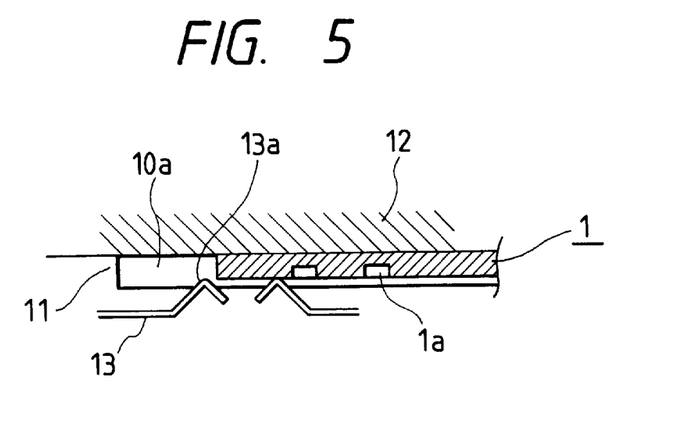
FIG. 5 is an explanatory view of a major portion showing a relationship of relative positions between the connector terminals and the IC card contacts in the operation stage of FIG. 4.
Figure 6:
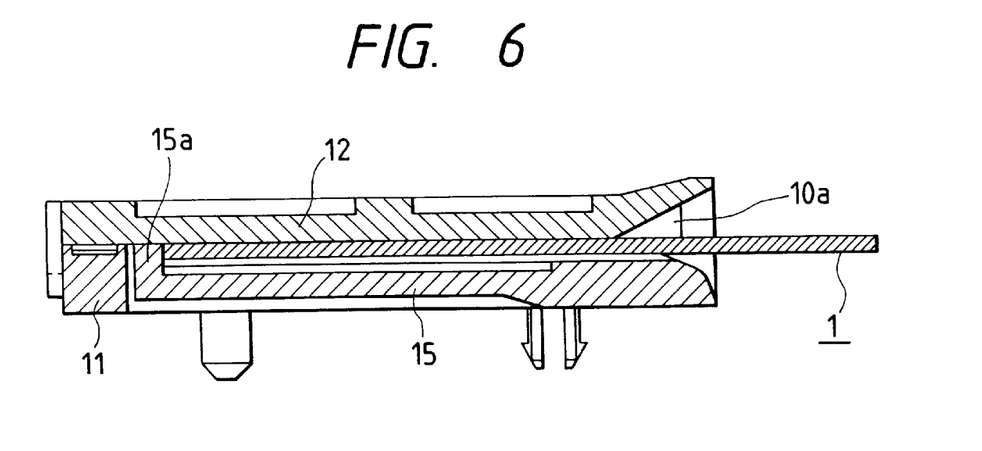
FIG. 6 is an explanatory view showing the IC card immediately before the completion of IC card insertion.
Figure 7:
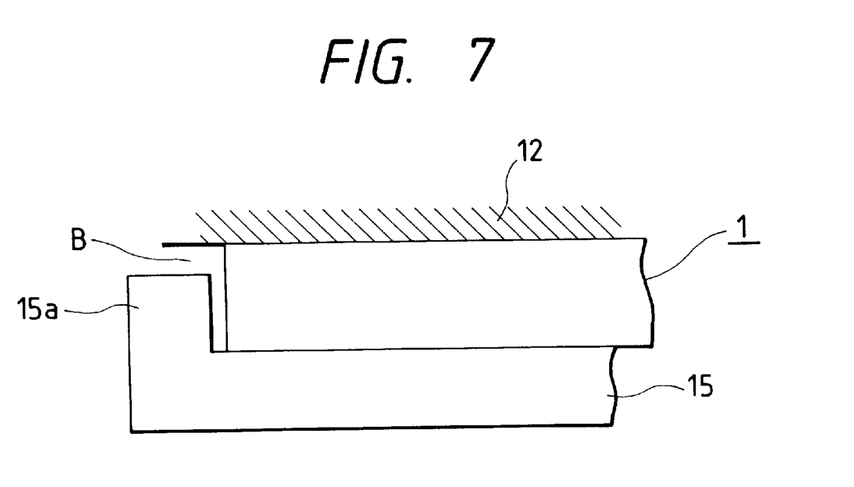
FIG. 7 is an enlarged view of a major portion in FIG. 6.
Figure 8:
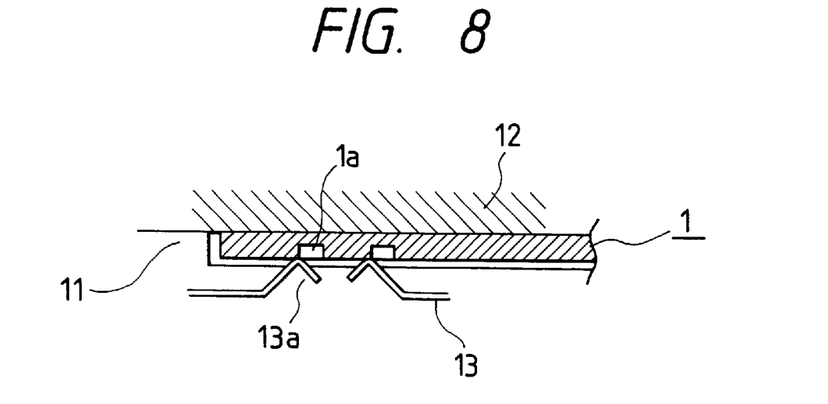
FIG. 8 is an explanatory view of a major portion showing a relationship of relative positions between the connector terminals and the IC card contacts in the operation stage of FIG. 6.
Figure 9:
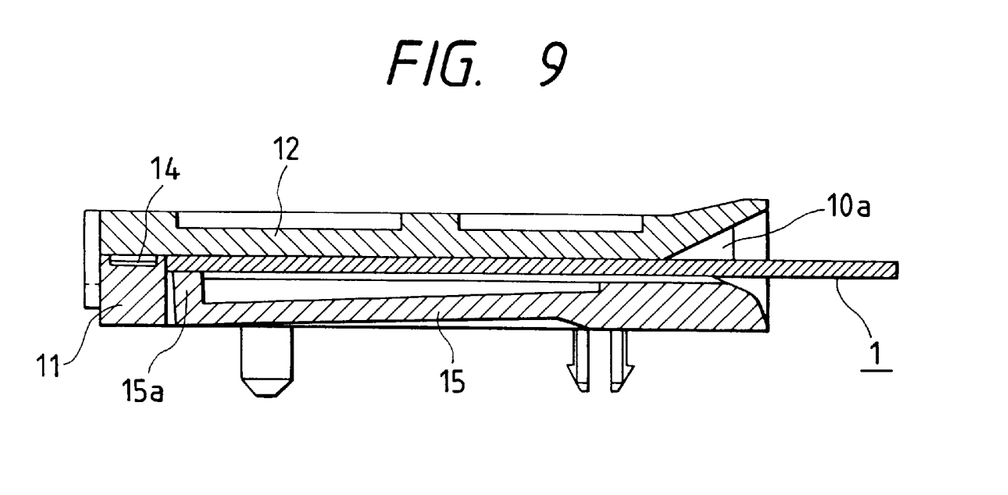
FIG. 9 is an explanatory view showing the state of the IC card after completion of card insertion.
Figure 10:
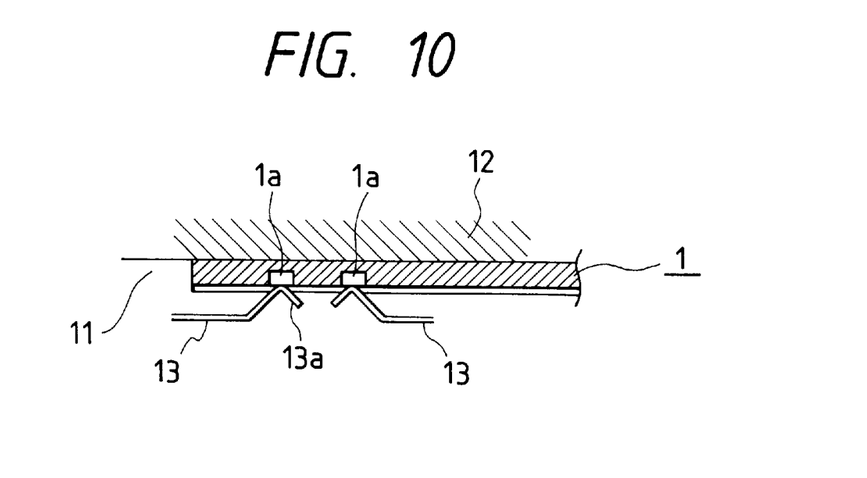
FIG. 10 is an explanatory view of a major portion showing a relationship of relative positions between the connector terminals and the IC card contacts in the operation stage of FIG. 9.
Figure 11A:
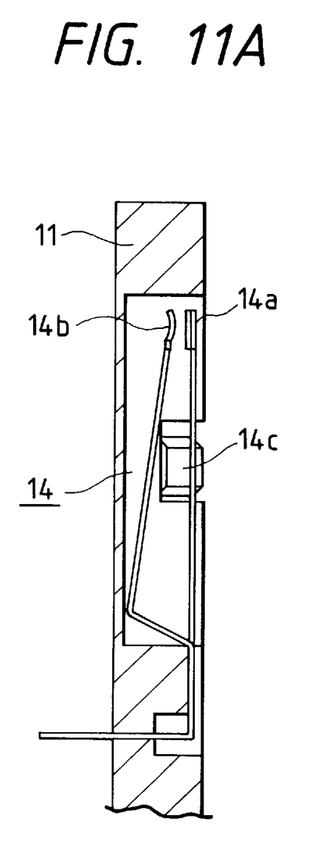
FIGS. 11A and 11B are explanatory views of a major portion of the same embodiment showing the detection switch in a standby position.
Figure 11B:
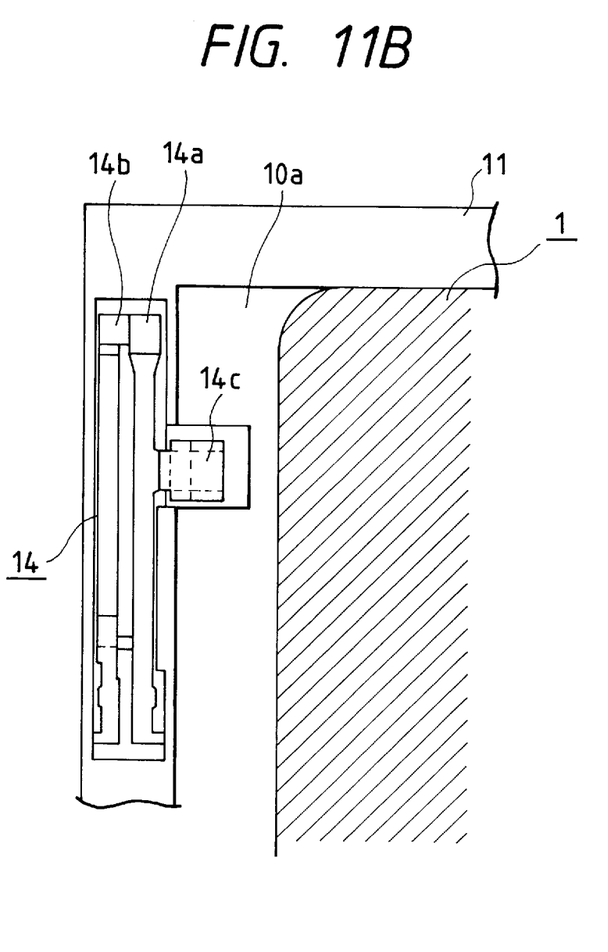
Figure 12A:
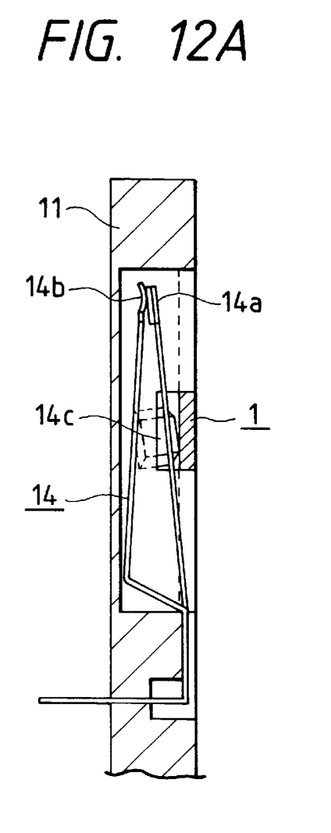
FIGS. 12A and 12B are explanatory views of a major portion showing the detection switch in a detecting state.
Figure 12B:
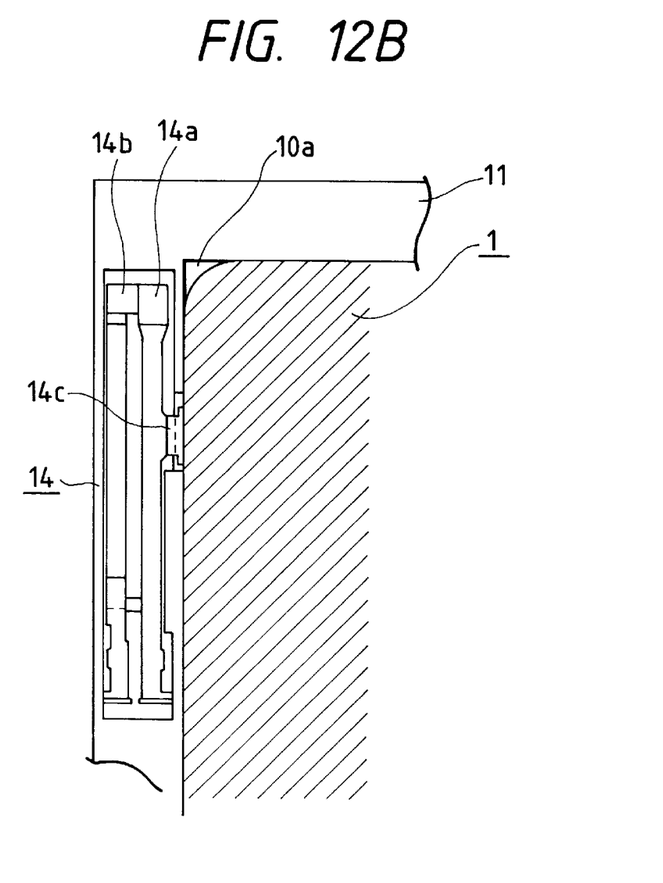

An IC card connector of a preferred embodiment will be explained with reference to the accompanying drawings. FIG. 1 is a plan view, partly in section, of the IC card connector of the embodiment; FIG. 2 is a longitudinal sectional view of the connector taken along line II—II of FIG. 1; FIG. 3 is an explanatory view of a major portion showing terminals of the connector in a standby state without the IC card inserted; FIG. 4 is an explanatory view showing the IC card inserted partway; FIG. 5 is an explanatory view of a major portion showing a relationship of relative positions between the connector terminals and IC card contacts in the operation state in FIG. 4; FIG. 6 is an explanatory view showing the IC card immediately before completion of insertion; FIG. 7 is an enlarged view of a major portion in FIG. 6; FIG. 8 is an explanatory view of a major portion showing a relationship of relative positions between the connector terminals and the IC card contacts in the operation stage of FIG. 6; FIG. 9 is an explanatory view showing the state of the IC card after completion of card insertion; FIG. 10 is an explanatory view of a major portion showing a relationship of relative positions between the connector terminals and the IC card contacts in the operation stage of FIG. 9; FIGS. 11A and 11B are explanatory views of a major portion showing the detection switch in a standby position, from side and from above respectively; and FIGS. 12A and 12B are explanatory views of a major portion showing the detection switch in a detecting state from side and from above respectively.

In the IC card connector of the present invention, a housing 10 having a card slot 10a is comprised of a base 11 made of a synthetic resin and an upper cover 12 made of a synthetic resin jointed and formed integrally on the base 11. On the base 11 a plurality of terminals 13 having a triangular contacting portion 13a on the free end side is fixedly mounted cantilevered, and incorporate a detection switch 14 for detecting the completion of insertion of the IC card 1 into the card slot 10a. Furthermore, on the base 11 an elastic piece 15 is integrally formed, extending cantilevered in the direction of insertion (in the direction of the arrow in FIG. 1) of the IC card 1, and a spring piece 16 is also integrally formed to press the IC card 1 inserted into the card slot 10a against the upper cover 12 to thereby provide the upper cover 12 with a guiding function.

The terminals 13 correspond to the contacts 1a arranged on the bottom surface of the IC card 1. The contacting portion 13a of each terminal 13 is protruded a little into the card slot 10a to provide the contact 1a with elastic contact.

On the free end portion of the elastic piece 15 is provided a click projection 15a which protrudes into the card slot 10a and is driven by the forward end in the direction of insertion of the IC card 1 immediately before complete insertion of the IC card 1. The click projection 15a is designed to be positioned in the vicinity of the detection switch 14. The detection switch 14 is disposed adjacently to the innermost portion of the card slot 10a, and a conductive actuator 14a which is secured cantilevered and elastically deflects along the direction of thickness of the housing 10 is so made as to freely contact, and release from, a detection contact portion 14a. The actuator 14a has a tongue piece 14c projecting obliquely downwardly from side into the card slot 10a nearly midway between the free end portion and the base end portion. The tongue piece 14c is driven by the forward end in the direction of insertion of the IC card 1 immediately before completion of insertion, being pushed downwardly and inwardly.

That is, as shown in FIG. 11, the actuator 14a made of a metal piece, being held off the detection contact portion 14b with the rigidity of itself, the switch is in the off position when the IC card 1 is not inserted into the innermost part of the card slot 10a of the housing 10. However, when the IC card 1 is inserted fully into the card slot 10a as shown in FIG. 12, the forward end of the IC card 1 in the direction of insertion contacts the tongue piece 14c of the actuator 14a, thus pushing in the tongue piece 14c downwardly, and therefore the free end portion of the actuator 14a is pushed in downwardly through the tongue piece 14c, to thereby elastically contact the detection contact portion 14b to turn on the switch. When the detection switch 14 is operated from off to on, it is possible to know that the insertion of the IC card 1 into the card slot 10a is completed.

According to the present embodiment, since a reaction force (elastic force) produced by the actuator 14a which is driven by the IC card 1 through the tongue piece 14c is set in an upward direction approximately orthogonal with the direction of discharge of the IC card 1, the actuator 14a will never push the IC card 1 out of position in the direction of discharge if the holding pressure of the connector for holding the inserted IC card 1 in position is decreased due to deterioration with age. In the present embodiment, a great stroke can be provided at the free end portion of the actuator 14a which contacts, and release from, the detection contact portion 14b simply by pushing slightly downwardly the tongue piece 14c which is protrusively formed nearly in the midpoint between the free end portion and the base end potion of the actuator 14a, thus properly operating the detection switch on and off.

Next, operation of the elastic piece 15 will be explained together with IC card inserting operation. First, in the standby state (eject state) shown in FIGS. 2 and 3, the elastic piece 15 is positioned in parallel with the upper cover 12 without deflection, with the click projection 15a at the free end portion projecting for a specific length into the card slot 10a in the vicinity of the detection switch 14. Furthermore, in the above-described standby state, the contact portion 13a of each terminal 13 is protruded a little into the card slot 10a. The The IC card 1, when inserted into the card slot 10a, goes inwardly in the card slot 10a while being guided by the upper cover 12, and comes in contact with the contact portion 13a of the terminal 13. Therefore, as shown in FIGS. 6 and 8, as the IC card 1 is further inserted into the card slot 10a, the bottom surface of the IC card 1 pushes in the contact portions 13a of the terminal 13 downwardly. Therefore, these contact portions 13a come into elastic contact with the bottom surface of the IC card 1 by the elasticity of the terminals 13 fixed cantilevered. The click projection 15a of the elastic piece 15 receives an external force from the IC card 1 after the IC card thus inserted arrives at the vicinity of the innermost part of the card slot. Before arrival, as shown in FIG. 7, there exists a clearance B, which is narrower than a half of the thickness of the IC card 1, between the upper end of the click projection 15a and the upper cover 12.

When the IC card 1 that has been inserted reaches the vicinity of the innermost part of the card slot 10a, the forward end in the direction of insertion of the IC card 1 pushes to deflect the elastic piece 15, going over the click projection 15a until it strikes the inner wall surface of the base 11, as shown in FIGS. 9 and 10. At the same time, the contacts 1a arranged on the bottom surface of the IC card 1 contact the contact portions 13a of corresponding terminals 13. Immediately after a feel of a click is produced by the click projection 15a, the insertion of the IC card 1 is completed. That is, the IC card 1 is inserted and held in a specific position (loading position) where signals will be received and given off. Furthermore, the click projection 15a is located very close to the tongue piece 14c of the detection switch 14 as shown in FIG. 1. When the IC card 1 pushes the click projection 15a downwardly, the IC card 1 pushes the actuator 14a also downwardly through the tongue piece 14c; immediately after a feel of a click is produced, the detection switch 14 is changed from off to on, indicating that the insertion of the IC card 1 is completed. Therefore, the user who has inserted the IC card 1 into the card slot 10a can definitely feel by a click sound and vibration that the IC card 1 is properly inserted.

In the meantime, when the user pulls out the IC card 1 from the loading position shown in FIGS. 9 and 10, the elastic piece 15 pushes up the click projection 15 back into the card slot 10a by the elasticity of itself and also the actuator 14a goes off from the detection contact portion 14b with the elasticity of itself, thereby operating the detecting switch from on to off. Furthermore, each terminal 13 pushes up the contact portion 13a back into the card slot 10a by the elasticity of itself, finally returning to the standby position shown in FIGS. 2 and 3.

Figure 13:
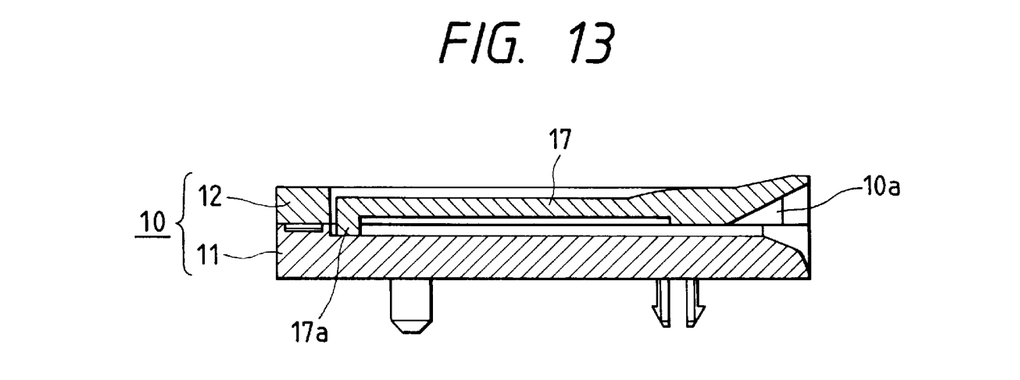
FIG. 13 is a longitudinal sectional view of another embodiment of the IC card connector according to the present invention.

In the above-described embodiment, the IC card connector with the elastic piece 15 formed integrally with the base 11 has been described. It should be noticed, however, that, as shown in FIG. 13, theremaybeprovided, on the upper cover 12, an elastic piece 17 extending like a cantilever in the direction of IC card insertion and using the free end portion as a downward click projection 17a. That is, the elastic piece 17 functions almost similarly to the elastic piece 15 notwithstanding the difference that the click projection 17a is driven upwardly by the forward end in the direction of insertion of the IC card immediately before the completion of card insertion.

The present invention of the heretofore described constitution has the following advantages.

There is provided an elastic piece in the housing section of the connector, which is supported cantilevered and extended in the direction of IC card insertion, so that the free end thereof is formed as a click projection. Immediately before the completion of insertion when the click projection is driven by the IC card, a feel of a click is produced, thus completing the IC card insertion. According to the IC card connector of the above-described constitution, the user inserting the IC card into the card slot formed in the housing is able to definitely feel by a click and vibration the proper insertion of the IC card. It is, therefore, possible to prevent incomplete insertion of the IC card and accordingly to prevent the user from mistaking incomplete IC card insertion as a trouble of the IC card or equipment and furthermore to prevent malfunction resulting from defective IC card insertion and giving damage to electronic components.

Furthermore, if the click projection of the elastic piece is designed to be positioned in the vicinity of the detection switch, the driving the click projection to produce a feel of a click and the on-off operation of the detection switch can be substantially timed with ease, thus further improving reliability of the IC card connector.

While the preferred embodiment of the IC card connector has been disclosed, it will be appreciated that various modifications may be made without departing from the scope and true spirit of the present invention.

What is claimed is:

1. An IC card connector, comprising: a housing having a card slot into which said IC card is inserted, a plurality of terminals secured cantilevered in said housing and having contact portions protruding into said card slot, a detection switch mounted in the back of said card slot for detecting whether or not IC card insertion into said card slot has been completed, and an elastic piece extended cantilevered in the direction of IC card insertion and formed as a click projection with the free end thereof protruding into said card slot;

said click projection constructed such that said elastic piece has an abutting surface which is approximately perpendicular to the inserting direction and to which the front edge of said IC card is abutted, and when the front edge of said IC card is abutted against said abutting surface during the inserting operation of said IC card, the click projection is flexed in a direction crossing at a right angle of the inserting direction and when the amount of flexing state reaches a predetermined amount, the front edge of said IC card rides over said click proiection:

said IC card connector being constituted constructed such that when said click projection is driven by the front edge of said IC card in the direction of insertion of said IC card to push to deflect said elastic piece, a plurality of contacts arranged on said IC card come into elastic contact with corresponding contact portions of each terminal of said connector respectively, and said IC card turns on and off said detection switch.

2. The IC card connector according to claim 1, wherein said click projection of said elastic piece is positioned in the vicinity of said detection switch.

* * * * *